Nov. 28, 1961    A. W. PENN    3,010,285
REFRIGERATED BAFFLES FOR VACUUM SYSTEMS
Filed April 22, 1960
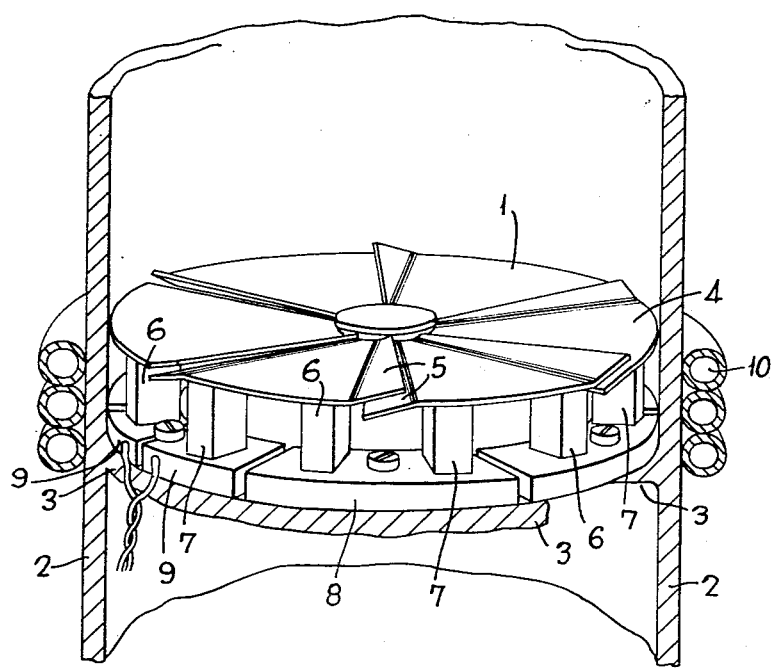

United States Patent Office 3,010,285
Patented Nov. 28, 1961

3,010,285
REFRIGERATED BAFFLES FOR
VACUUM SYSTEMS
Alan William Penn, Aldermaston, England, assignor to Associated Electrical Industries, London, England, a British company
Filed Apr. 22, 1960, Ser. No. 24,004
Claims priority, application Great Britain Apr. 28, 1959
4 Claims. (Cl. 62—3)

This invention relates to refrigerated baffles for very high vacuum systems, and is particularly suitable for laboratory applications.

It is well known that, in very high vacuum systems which are pumped by oil or mercury diffusion pumps, a lower ultimate pressure can be obtained if a refrigerated metal baffle is placed above the pump in order to remove, by condensation, any mercury or oil vapour produced by back-streaming from the pump.

The baffle may be cooled by the use of a non-sealed system in which, for example, liquid air or an acetone-solid carbon dioxide mixture is brought into contact with the metal of the baffle and allowed to boil off. Alternatively, a conventional sealed refrigerator unit may be used, and the refrigerant circulated through the baffle. The first method requires supplies of cooling materials and necessitates the available personnel to replenish the material when long periods of operation are desired. In the case in which a sealed refrigerator unit is employed in connecting the system to the unit, it is most important to ensure that water vapour is not present in the system, since this is liable to freeze in the pump. Skilled personnel are therefore required. Also, in order to improve the performance of the baffle and pumping system, it is often desirable to bake the baffle in order to outgas it, and this requires additional heating facilities. Due to the presence of the refrigerant, the upper baking temperature is severely limited and warm-up times tend to be very long. The conventionally refrigerated baffle is, for small-scale work, expensive, bulky and time-consuming.

It is the object of this invention to provide a means whereby a refrigerating effect can be very simply and conveniently applied, and, in addition, the baffle may readily be heated for outgassing purposes.

According to the present invention thermo-electric junctions are provided integral with the baffle across which an E.M.F. is caused to appear of the sign and magnitude required to cause a heating or cooling effect to be present at the baffle as desired.

The invention thus makes use of the known Peltier effect by which, if an E.M.F. is applied to a circuit made up of selected different materials, a temperature difference appears across the junctions between the two materials. If the E.M.F. is applied in the reverse sense, the temperature difference is also reversed.

Suitable materials which may be employed in carrying out the invention to obtain temperature differences up to about 50° C., are heavy intermetallic semiconductors, such as bismuth telluride or antimony telluride; whilst for greater temperature differences pseudo-binary alloys of such materials are required, for example bismuth telluride-bismuth selenide mixtures.

In order that the invention may be fully understood, reference will now be made to the accompanying drawing, which shows somewhat diagrammatically and in perspective an arrangement in accordance with the invention.

Referring to the drawing, the baffle 1 is enclosed by a conduit 2 forming part of the evacuating system, the baffle and its associated cooling and heating system being supported by a ledge 3 extending inwardly from the conduit 2. The baffle is in the form of sector-shaped vanes or fins 4 having overlapping edges 5 which are bent, as shown, to provide radial passages for the passage of the gas or vapour produced during the process of evacuation.

The thermo-electric junctions by which the baffle is heated or cooled are provided between bodies of semiconductor material of N-type and P-type conductivity, the junction between the bodies being formed by the vanes 4. As illustrated the vanes are supported on bodies 6, 7 of differing type conductivity material to one end of each of which the appropriate vanes are electrically connected. Thus bodies 6 may be of N-type material, and those 7 of P-type material. The bodies 6, 7, are in turn supported upon arcuate conductors 8 which rest upon the ledge 3 and which serve to connect together the lower ends of adjacent bodies so as to form junctions between them. Conductors 8 are secured to ledge 3 by screws of any suitable material, e.g. nylon, which will not loosen under the influence of the temperature changes experienced. In the arrangement shown, vanes 4 serve to connect adjacent bodies of opposite type material together at the upper ends, whilst the conductors 8 connect the lower ends of adjacent bodies together, the discontinuities between the vanes and conductors being staggered so that the bodies are connected in a series circuit giving alternate P.N. and N.P. junctions. Terminal conductors 9 allow current to be supplied to the series circuit so formed from a suitable source of supply.

During a cooling cycle in which the polarity of the current supply to the series circuit is such that the upper end junctions between the bodies cool the vanes by the use of the Peltier effect above noted, the lower end junctions formed by the conductors 8 become heated. A pipe 10 through which cooling fluid may be passed is accordingly provided around the outer periphery of the conduit 2 in the vicinity of ledge 3.

The maximum cooling is fixed by the balance of Peltier cooling with Joule heating, thermal conduction from the sink and the load. By passing the current in the reverse direction, the effect is to heat the baffle vanes and to tend to cool the conductors 8, which, however, are maintained at an approximately constant temperature by the circulating water. It should be noted that whereas inevitable Joule heating losses oppose the refrigeration of the baffle vanes, these same losses assist the heating of the vanes. Consequently, the warm-up time is of order minutes, and the final temperature is limited only by the necessity of preventing diffusion of impurities from the junctions into the bulk semiconductor, thus allowing temperatures of order 200° C. with present materials.

Other configurations are feasible. One may cascade the junctions, cooling the hot junction of one device by the cold junction of another; in this manner, a further reduction in temperature is possible. The vanes may be of the chevron type, and the junctions may be wired in series, parallel or a mixture of each.

The compounds bismuth telluride and antimony telluride above mentioned as being utilised for the semiconductor materials employed to form the p.n. junctions are the dimetal tritelluride compound, viz. 40 atomic percentage bismuth or antimony, and 60 atomic percentage tellurium. The carrier concentration should be adjusted by means of suitable doping materials, bismuth tri-iodide, iodine or a cuprous halide for n-type material, or lead for p-type material, to fall within the range $10^{18}$ to $10^{19}$ carriers per cm.$^3$. Pseudo-binary alloys require the same range of concentration and may consist of either bismuth telluride 70 to 95 atomic percentage, antimony telluride 5 to 30 atomic percentage, or bismuth telluride 100 to 90 atomic percentage, bismuth selenide 0 to 10 atomic percentage.

What I claim is:
1. In a high vacuum system a conduit through which flows the medium to be evacuated, and a temperature adjustable baffle located in said conduit, said baffle comprising spaced sector-shaped vanes disposed across said conduit, a plurality of bodies of semi-conductor material of opposite conductivity types, one each of said bodies being electrically connected at one end to each of said vanes so that each said vane constitutes a thermoelectric junction between two of said bodies of opposite conductivity type, conductor means for electrically connecting said bodies at their other ends to said conductor, means being arranged to form with said vanes and said bodies a series circuit having alternate p.n. and n.p. junctions therein, and terminal connections to said conductor means to enable current of a desired polarity and magnitude to flow in said series circuit and produce a temperature change at said junctions.

2. A temperature-adjustable baffle as claimed in claim 1, in which said conductor means comprises arcuate electrical conductors arranged to form an annular ring axially spaced from said vanes, said bodies of opposite conductivity type being radially spaced in alternation and disposed in co-axial relation between said vanes and said arcuate conductors.

3. A temperature-adjustable baffle as claimed in claim 2 and located in a conduit for conveying said medium, in which said arcuate conductors are supported on a ledge internally projecting from said conduit, cooling means being located around the outer periphery of said conduit in the vicinity of said arcuate conductors.

4. A temperature-adjustable baffle as claimed in claim 3, in which said bodies of semi-conductor material comprise a dimetal tri-telluride compound selected from the group consisting of bismuth and antimony, said compound being doped with an impurity activator to render said compound of the desired conductivity.

References Cited in the file of this patent

UNITED STATES PATENTS

| | | |
|---|---|---|
| 2,051,185 | Stalcup | Aug. 18, 1936 |
| 2,910,836 | Karrer | Nov. 3, 1959 |
| 2,944,404 | Fritts | July 12, 1960 |